United States Patent [19]
Jeffries

[11] Patent Number: 5,582,047
[45] Date of Patent: Dec. 10, 1996

[54] THEFT PROOF AUTOMOBILE IGNITION ROD

[76] Inventor: Robert Jeffries, 12512 S. State, Chicago, Ill. 60628

[21] Appl. No.: 129,372

[22] Filed: Sep. 30, 1993

[51] Int. Cl.⁶ ........................................ B26D 1/18
[52] U.S. Cl. .................. 70/252; 70/422; 403/328; 74/2
[58] Field of Search .............. 70/252–255, 181, 70/237, 241, 422; 403/328; 74/2; 180/287

[56] References Cited

U.S. PATENT DOCUMENTS

| | | | |
|---|---|---|---|
| 3,596,483 | 8/1971 | Elliott | 70/422 |
| 3,651,329 | 3/1972 | Marlowe et al. | 70/255 |
| 3,807,237 | 4/1974 | Scharres | 74/2 |
| 4,413,493 | 11/1983 | Meinsen et al. | 70/422 |
| 4,608,886 | 9/1986 | Bolton | 70/465 |
| 4,955,935 | 9/1990 | Katayama | 70/252 |

*Primary Examiner*—Peter M. Cuomo
*Assistant Examiner*—Darnell M. Boucher

[57] ABSTRACT

An automobile ignition system that includes an ignition key lock cylinder mechanism and an ignition switch mechanism located within an automobile steering column and interconnected by an ignition actuator rod that includes two detachably interconnected sections adapted to separate from each other, when tampered with, to help prevent the operation of the ignition system without a proper ignition key.

15 Claims, 2 Drawing Sheets

5,582,047

THEFT PROOF AUTOMOBILE IGNITION ROD

BACKGROUND OF THE INVENTION

1. Field of the Invention

This invention relates to automobile ignition systems and more particularly to an ignition actuator rod for connecting an ignition key lock cylinder mechanism to an ignition switch mechanism.

2. Description of the Background for the Invention

In many of the ignition systems of the current automobiles, wherein the key lock cylinder mechanism is connected to the ignition switch mechanism by a conventional, one-piece, ignition actuator rod, automobile thieves are able to start a car without a key by merely punching a hole in the outer covering or housing of the steering column, to access the actuator rod, and then moving the rod up or down to actuate the ignition switch.

Although applicant has not conducted a patent novelty search, he is familiar with the ignition systems of many of the current automobiles, and he has never seen a system having an arrangement designed to foil a car theft that includes a breakaway ignition actuator rod adapted to separate, when tampered with, to prevent the ignition from being actuated without a key.

SUMMARY OF THE INVENTION

It is a primary object of the invention to provide an automobile ignition system that includes a theft proof arrangement wherein the ignition actuating mechanism can be rendered unworkable by tampering with a certain portion of the ignition system.

A more specific object of the invention is the provision of an automobile ignition system wherein the ignition actuator rod, that connects the ignition key lock cylinder mechanism to the ignition switch mechanism, is a multi-piece unit designed to come apart when tampering occurs to prevent operation of the ignition system without a proper key.

These and other objects of the invention will be apparent from an examination of the following description and drawings.

DESCRIPTION OF THE PREFERRED EMBODIMENT

Figure 1:
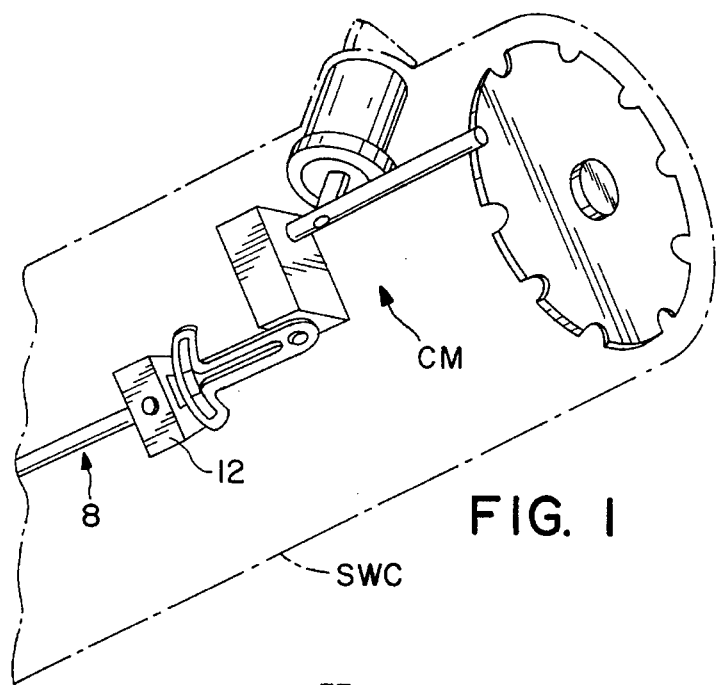
FIG. 1 is a fragmentary perspective view of a portion of an automobile steering column within which is housed portions of an automobile ignition system.

Referring now to the drawings for a better understanding of the invention, it will be seen in FIG. 1 that there is positioned within the steering wheel column SWC of an automobile, not shown, an ignition system that includes an ignition key lock cylinder mechanism, indicated generally at CM, and an ignition switch mechanism, indicated generally at SM, that are interconnected by an ignition actuator rod assembly indicated generally at 8.

Since the ignition key lock cylinder mechanism and the switch mechanisms may be of standard or conventional design, their structures are not shown or described in any detail. For purposes of comparison, a conventional, one-piece, actuator rod, indicated at CR, is illustrated in FIG. 2.

Figures 2, 3, 4:
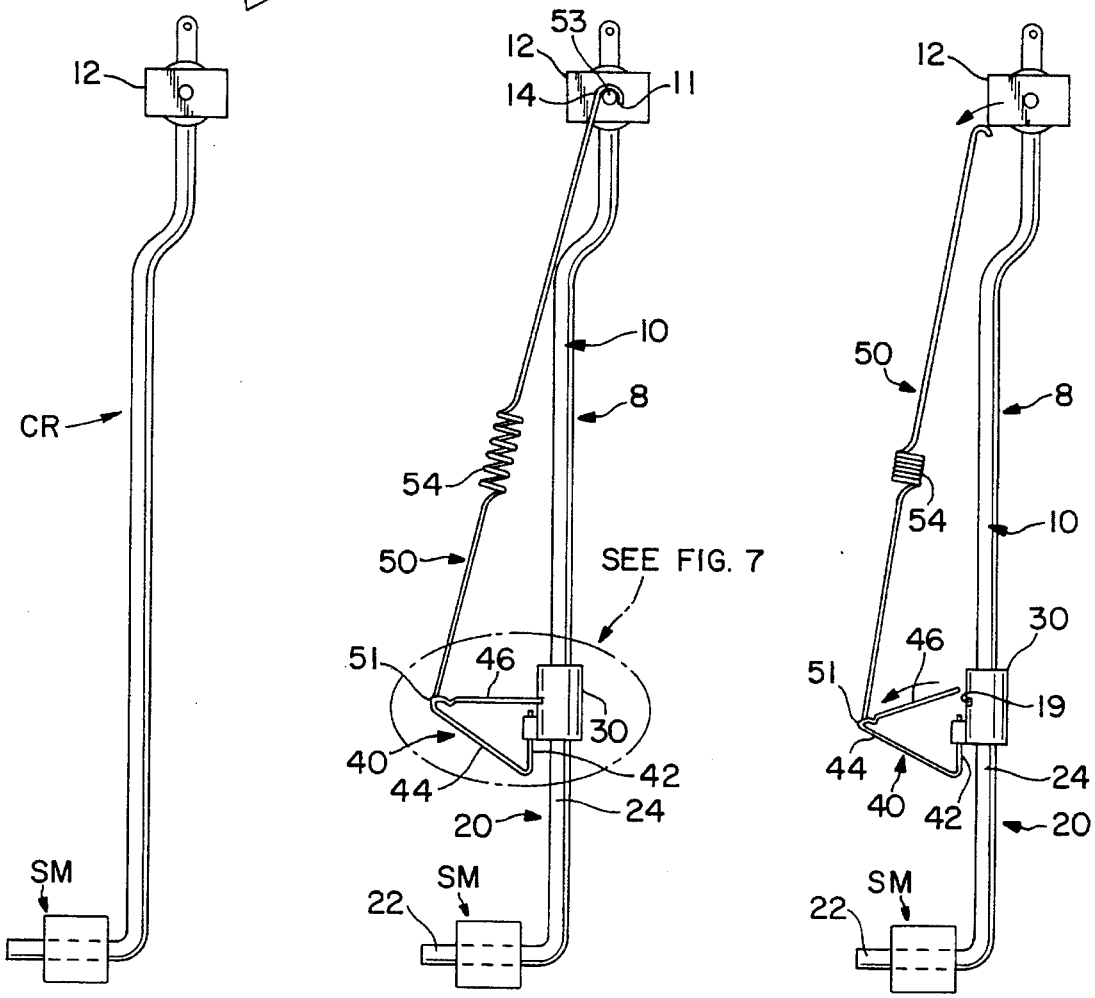
FIG. 2 is a side elevational view of a conventional ignition actuator rod of the type illustrated in FIG. 1.
FIG. 3 is a view similar to that of FIG. 2, but illustrating an ignition actuator rod embodying features of the present invention, with the trip wire and retaining member each shown in the engaged position.
FIG. 4 i a view similar to that of FIG. 3, but with the trip wire and the retaining member each shown in the disengaged position.

The essential feature of the present invention resides in the design, construction, and operation of the unique ignition actuator rod assembly which, as best seen in FIG. 3, includes separate, vertically disposed, upper and lower rod sections 10 and 20, respectively, that are detachably interconnected to each other, as hereinafter described. The upper and lower rod sections are arranged and disposed to separate from each other, when tampering occurs, to foil an attempt to start an automobile ignition without an ignition key.

Figure 5:
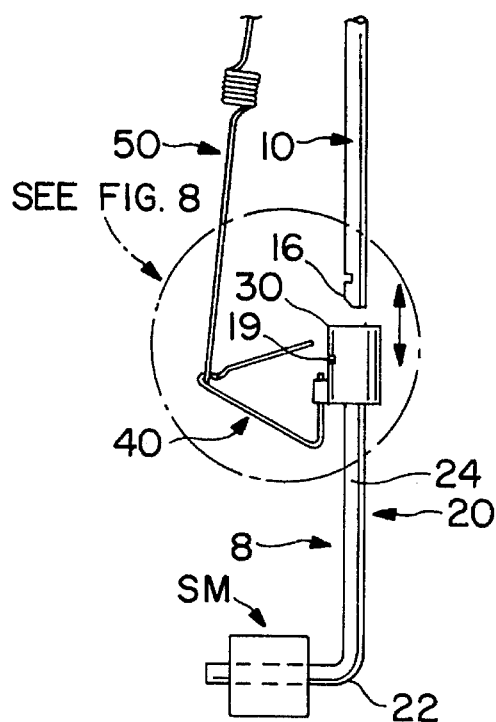
FIG. 5 is a view similar to that of a portion of FIG. 4, but with the upper and lower rod sections shown separated from each other.

As best seen in FIG. 3, ignition actuator rod upper section 10 has, at its upper end, at least one opening 11 for use in attaching the upper end to an element 12 of the ignition key lock cylinder mechanism CM by means of a pin 14, The lower end 16 of rod upper section 10, as best seen in FIGS. 4 and 5, is preferably tapered and presents on one side thereof a sloping cam surface 17 and a retaining element receiving recess 19 located immediately above said cam surface. The purpose of the cam surface 17 is to facilitate insertion of the upper rod section lower end into the junction box 30 of the rod lower section, as hereinafter described.

Rod lower section 20 may be provided, at its lower end, with an offset portion 22 arranged and disposed for attachment to a portion of an ignition switch mechanism SM.

At its upper end rod lower section 20 has an integral, generally cylindrical junction box, indicated generally at 30, that includes a lower base 32 having, extending upwardly therefrom, an integral tubular skirt 34, having a recess or pocket 37 adapted to receive the lower end 16 of the rod upper section 10.

Skirt 34 has, extending therethrough, an opening 39 adapted to receive the free end of a retaining element 46 as hereinafter described.

Figure 6:
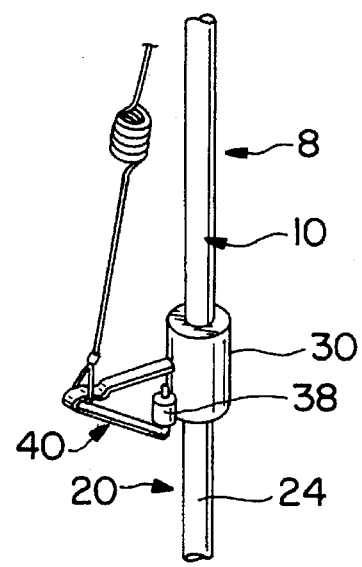
FIG. 6 is a perspective view of a portion of the structure illustrated in FIG. 3.

The rod upper and lower sections 10 are detachably interconnected by a retaining member indicated generally at 40. As best seen in FIG. 6, retaining member 40 is preferably a one-piece, spring-clip type device that includes relatively straight, integral first, second, and third sections 42, 44, and 46, respectively, which are joined to each other at acute angles.

Retaining member third section 46 functions as a retaining element; whereas retaining member first and second 42 and 44 function primarily as a spring means adapted to bias the third section or retaining element 46 out of engagement with the lower end 16 of rod upper section 10.

Figure 7:
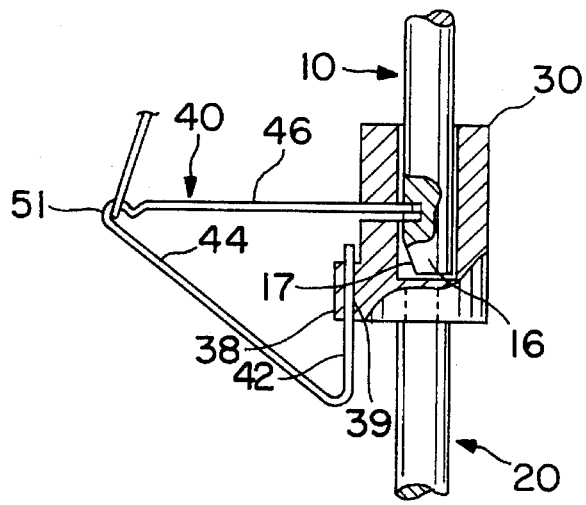
FIG. 7 is an enlarged view of a portion of the structure illustrated in FIG. 3, showing the upper and lower rod sections connected to each other.

As best seen in FIGS. 3, 6, and 7, junction box base 32 may be provided with an outwardly projecting, integral extension or boss 38 having an opening 39 therein adapted to receive the free upper end of retaining member first section 42.

Unless or until the ignition system is tampered with, this biasing action of the retaining element by the spring means is prevented by the tension exerted on the retaining member 40 in an upward direction by a resilient trip wire indicated generally at 50 to maintain the upper and lower rod sections connected to each other, as shown in FIGS. 3, 6, and 7.

The lower end of the trip wire is attached to retaining member 40 at the junction of the second and third sections, as shown in FIGS. 3 and 5–7, as indicated at 51; while the upper end of the trip wire 50 is detachably connected to an upper end portion of rod upper section, as indicated at 53.

Intermediate its ends trip wire includes a coiled portion 54 to provide tension between the upper and lower ends of the wire.

The connection between the trip wire and the upper end of the rod upper section is arranged and disposed so that the slightest lateral contact with the trip wire or the rod upper section will cause the wire to separate from the rod upper section upper end.

Figure 8:
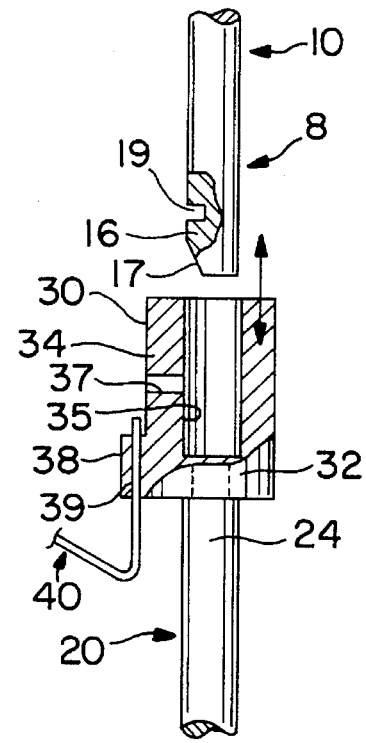
FIG. 8 is a fragmentary view similar to that of FIG. 5, but showing the upper and lower rod sections separated from each other; and It will be understood that, for purposes of clarity, certain elements may have been omitted from certain views where they are believed to be illustrated to better advantage in other views.

When this happens the loss of upward tension on the retaining member 40 will allow the spring action of the retaining member to bias the third section or retaining element 46 out of engagement with rod upper section lower end, thereby causing the rod upper and lower sections to separate from each other, as best seen in FIGS. 5 and 8.

Thus, it will be appreciated that the invention provides a unique, yet relatively inexpensive, arrangement for interconnecting the ignition key lock cylinder and ignition switch mechanisms by a two-piece ignition actuator rod that is designed, to come apart when a potential automobile thief attempts to break the steering column to start the ignition without a proper key.

What is claimed is:

1. In an automobile ignition system that includes an ignition key lock cylinder mechanism and an ignition switch mechanism positioned within an automobile steering column, an ignition actuator rod, for interconnecting said mechanisms, that includes detachably interconnected sections arranged and disposed to separate from each other, when tampered with, so as to prevent the operation of the ignition system, said rod comprising:

(a) an upper section having an rod upper section upper end, including means for attachment to said ignition key lock cylinder mechanism, and having a rod upper section lower end;

(b) a lower section having a rod lower section lower end, including means for detachable connection to said ignition switch mechanism, and having an rod lower section upper end, including an integral junction box;

(c) said junction box including a base with a skirt extending upwardly therefrom and having a space for receiving said rod upper section lower end;

(d) a retaining member for releasably maintaining said rod lower section lower end in said junction box space, said member including:

(i) a retaining element extending through an opening in said skirt for engagement with said rod upper section lower end to prevent it from coming out of said junction box;

(ii) spring means arranged and disposed to bias said element out of engagement with said rod upper section lower end;

(e) a resilient trip wire extending between an upper portion of said upper section and said retaining member and normally operable, when under tension, to overcome the biasing action of said spring means and thereby maintain said retaining element in engagement with said rod upper section lower end;

(f) said trip wire being detachably connected to said upper section, so that, in response to relatively slight lateral contact with said trip wire, or, in the alternative contact with said rod, said wire will become disconnected from said rod, thereby eliminating tension in said trip wire and allowing said spring means to bias said retaining element out of engagement with said rod upper section lower end, causing said upper and lower sections to separate from each other to prevent operation of said ignition system.

2. An automobile ignition system actuator rod according to claim 1, wherein said retaining member is a one-piece, spring-clip, device including one section that functions as said retaining element and including other sections that function as said spring means.

3. An automobile ignition system actuator rod according to claim 1, wherein said retaining member is a one-piece, spring-clip, device including generally straight first, second, and third sections having adjacent ends joined to each other and forming acute angles with each other.

4. An automobile ignition system actuator rod according to claim 3, wherein said retaining member third section is arranged and disposed to function as said retaining element, and wherein said first and second sections are arranged and disposed to function as said spring means.

5. An automobile ignition system actuator rod according to claim 3, wherein trip wire is connected to said retaining member at a location between said retaining member second and third sections, and wherein said retaining member first section is connected to said junction box.

6. In an automobile ignition system that includes an ignition key lock cylinder mechanism and an ignition switch mechanism positioned within an automobile steering column, an ignition actuator rod, for interconnecting said mechanisms, that includes detachably interconnected sections arranged and disposed to separate from each other, when tampered with, so as to prevent the operation of the ignition system, said rod comprising:

(a) an upper section having an rod upper section upper end, including means for attachment to said ignition key lock cylinder mechanism, and having a rod upper section lower end;

(b) a lower section having a rod lower section lower end, including means for detachable connection to said ignition switch mechanism, and having an rod lower section upper end, including a junction box having a space for receiving said rod upper section lower end;

(c) a retaining member for releasably maintaining said rod lower section lower end in said space, said member including:

(i) a retaining element extending through an opening in said junction box for engagement with said rod upper section lower end to prevent it from coming out of said space;

(ii) spring means arranged and disposed to bias said element out of engagement with said rod upper section lower end;

(d) a resilient trip wire extending between an upper portion of said upper section and said retaining member and normally operable, when under tension, to overcome the biasing action of said spring means and thereby maintain said retaining element in engagement with said rod upper section lower end;

(e) said trip wire being detachably connected to said upper section, so that, in response to relatively slight lateral contact with said trip wire, or, in the alternative contact with said rod, said wire will become disconnected from said rod, thereby eliminating tension in said trip wire and allowing said spring means to bias said retaining element out of engagement with said rod upper section lower end, causing said upper and lower sections to separate from each other to prevent operation of said ignition system.

7. An automobile ignition system actuator rod according to claim 6, wherein said retaining member is a one-piece, spring-clip, device including one section that functions as said retaining element and including other sections that function as said spring means.

8. An automobile ignition system actuator rod according to claim 6, wherein said retaining member is a one-piece, spring-clip, device including generally straight first, second, and third sections having adjacent ends joined to each other and forming acute angles with each other.

9. An automobile ignition system actuator rod according to claim 8, wherein said retaining member third section is arranged and disposed to function as said retaining element, and wherein said first and second sections are arranged and disposed to function as said spring means.

10. An automobile ignition system actuator rod according to claim 8, wherein said trip wire is connected to said retaining member at a location between said retaining member second and third sections, and wherein said retaining member first section is connected to said junction box.

11. In an automobile ignition system that includes an ignition key lock cylinder mechanism and an ignition switch mechanism positioned within an automobile steering column, an ignition actuator rod, for interconnecting said mechanisms, that includes detachably interconnected sections arranged and disposed to separate from each other, when tampered with, so as to prevent the operation of the ignition system, said rod comprising:

(a) an rod upper section having an upper end, including means for attachment to said ignition key lock cylinder mechanism, and having a lower second end;

(b) a rod lower section having a lower end, including means for detachable connection to said ignition switch mechanism, and having an upper second end;

(c) the second end of one of said rod sections including a junction box having a space for receiving the second end of the other of said rod sections;

(d) a retaining member for releasably maintaining said other rod section second end in said space, said member including:
(i) a retaining element extending through an opening in said junction box for engagement with said other rod section second end to prevent it from coming out of said space;
(ii) spring means arranged and disposed to bias said element out of engagement with said other rod section second end:

(d) a resilient trip wire extending between an upper portion of said rod upper section and said retaining member and normally operable, when under tension, to overcome the biasing action of said spring means and thereby maintain said retaining element in engagement with said other rod section second end;

(e) said trip wire being detachably connected to said rod upper section, so that, in response to relatively slight lateral contact with said trip wire, or, in the alternative contact with said rod, said wire will become disconnected from said rod, thereby eliminating tension in said trip wire and allowing said spring means to bias said retaining element out of engagement with said other rod section second end, causing said rod sections to separate from each other to prevent operation of said ignition system.

12. An automobile ignition system actuator rod according to claim 11, wherein said retaining member is a one-piece, spring-clip, device including one section that functions as said retaining element and including other sections that function as said spring means.

13. An automobile ignition system actuator rod according to claim 11, wherein said retaining member is a one-piece, spring-clip, device including generally straight first, second, and third sections having adjacent ends joined to each other and forming acute angles with each other.

14. An automobile ignition system actuator rod according to claim 11, wherein said retaining member third section is arranged and disposed to function as said retaining element, and wherein said first and second sections are arranged and disposed to function as said spring means.

15. An automobile ignition system actuator rod according to claim 11, wherein said trip wire is connected to said retaining member at a location between said retaining member second and third sections, and wherein said retaining member first section is connected to said junction box.

* * * * *